United States Patent
Lin

(10) Patent No.: US 7,872,818 B2
(45) Date of Patent: Jan. 18, 2011

(54) APPARATUS FOR COUPLING FIRST LENS TO SECOND LENS

(75) Inventor: Tsung-Yu Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 27 days.

(21) Appl. No.: 12/472,294

(22) Filed: May 26, 2009

(65) Prior Publication Data

US 2009/0316280 A1 Dec. 24, 2009

(30) Foreign Application Priority Data

Jun. 24, 2008 (CN) ............... 2008 1 0302297

(51) Int. Cl.
G02B 7/02 (2006.01)
(52) U.S. Cl. ............ 359/819; 359/811
(58) Field of Classification Search ......... 359/811, 359/819–822
See application file for complete search history.

(56) References Cited

U.S. PATENT DOCUMENTS

| 7,304,812 | B1 * | 12/2007 | Lee et al. ............... 359/811 |
| 7,349,165 | B2 * | 3/2008 | Chien .................... 359/821 |
| 2004/0228012 | A1 * | 11/2004 | Sakamoto ............... 359/820 |

* cited by examiner

Primary Examiner—Darryl J Collins
(74) Attorney, Agent, or Firm—Raymond J. Chew

(57) ABSTRACT

An exemplary apparatus for coupling a first lens to a second lens includes a base, a first plate, a second plate, a recess, and an elastic member. The base has a top surface. The first plate protrudes from the top surface. The second plate is opposite to the first plate and protrudes from the top surface. The recess is defined in the top surface and positioned between the first plate and the second plate. The recess is configured for receiving the second lens. The elastic member is positioned on the top surface. A first end of the elastic member is connected with the first plate. The elastic member is configured for exerting a force on the first lens such that the first lens can be cooperatively clamped between a second end of the elastic member and the second plate.

4 Claims, 5 Drawing Sheets

APPARATUS FOR COUPLING FIRST LENS TO SECOND LENS

BACKGROUND

1. Technical Field

The present invention relates to an apparatus for coupling a first lens to a second lens.

2. Description of Related Art

Nowadays, lens modules have been widely used in various portable electronic devices. A typical apparatus for coupling a first lens to a second lens includes a plurality of recesses. A plurality of second lenses are placed into the recesses without any fixing means. Then a plurality of first lenses are coupled to the second lenses respectively to form a lens assembly. Because the second lenses are not fixed in the recesses, the second lenses may shake when the apparatus shakes. The shake of the second lenses may result in assembly error, which may deteriorate imaging quality of the lens assembly.

Therefore, a new apparatus for coupling a first lens to a second lens is desired to overcome the above mentioned problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
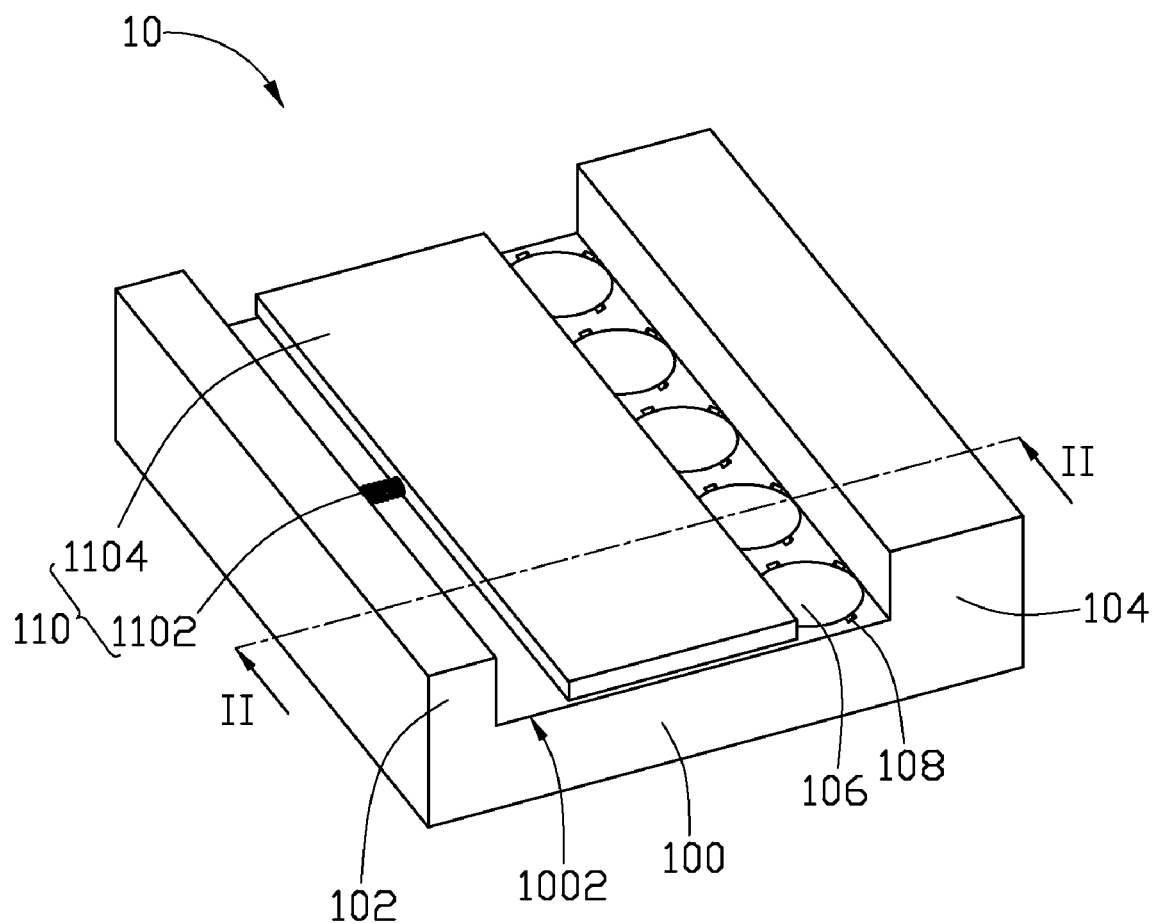
FIG. 1 is an isometric view of an apparatus for coupling a plurality of first lenses to a plurality of second lenses according to a first embodiment.
Figure 2:
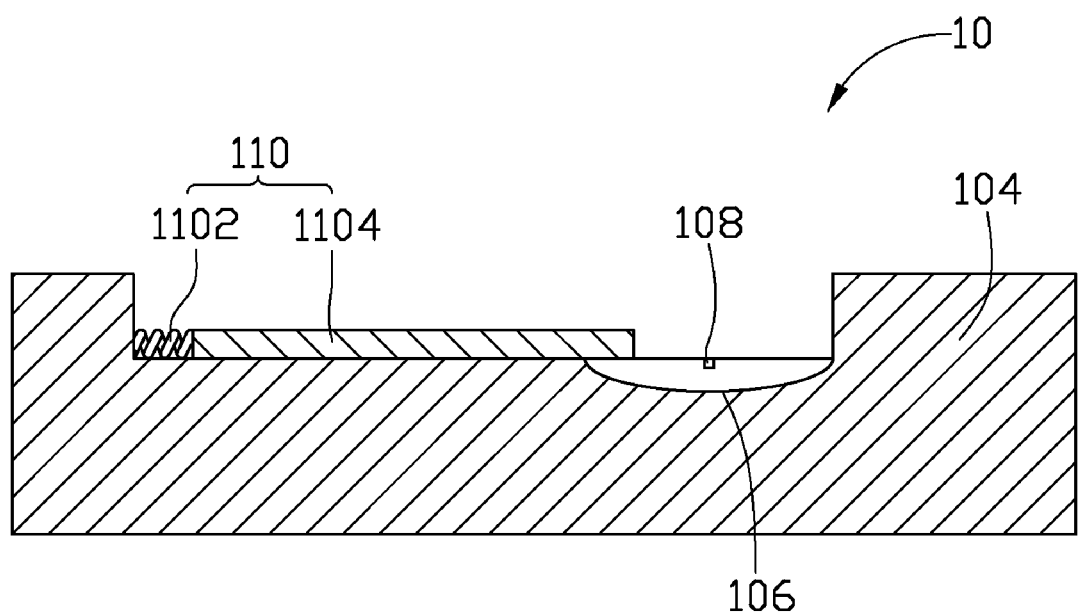
FIG. 2 is a cross-sectional view of the apparatus of FIG. 1, taken along the line II-II thereof.
Figure 3:
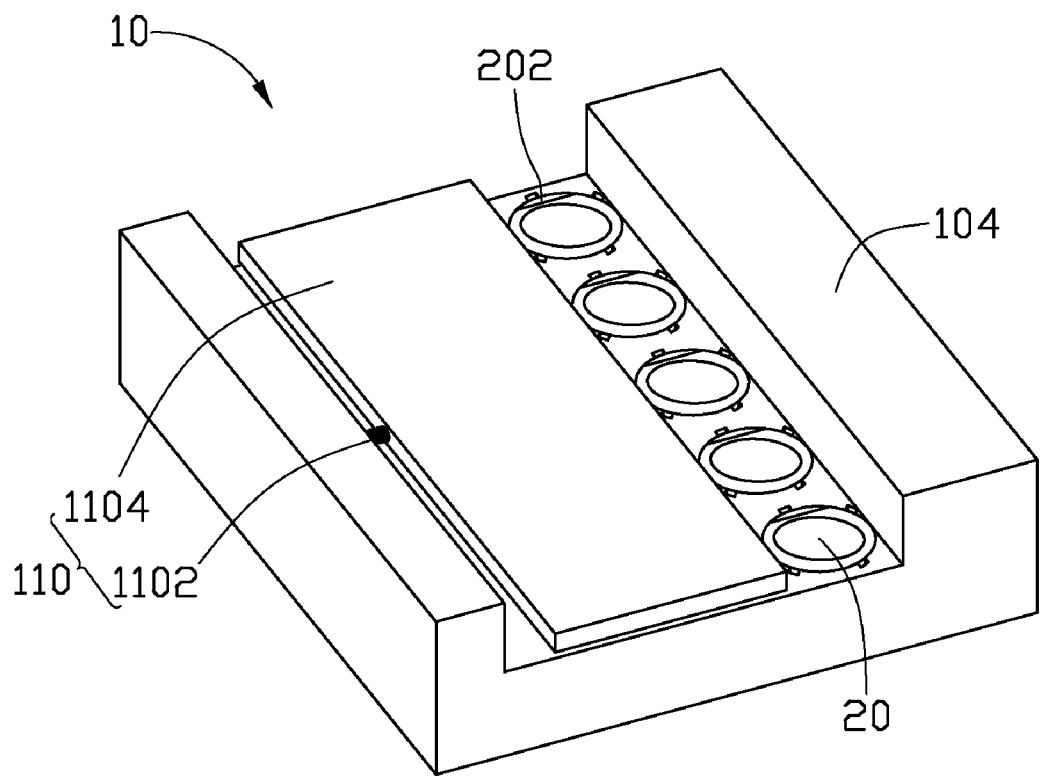
FIG. 3 is an isometric view of the apparatus of FIG. 1, with a plurality of first lenses clamped between an elastic member and a second plate.

Referring to FIGS. 1-3, an apparatus 10 for assembling a plurality of second lenses (not shown) to a plurality of first lenses 20 is shown. The apparatus 10 includes a base 100 having a top surface 1002, a first plate 102 protruding from the top surface 1002, a second plate 104 protruding from the top surface 1002, and an elastic member 110. The second plate 104 is opposite to the first plate 102. A plurality of recesses 106 are defined in the top surface 1002, and each recess 106 is configured for receiving a corresponding first lens 20 therein. The elastic member 110 includes a clamping plate 1104 and a spring 1102. One end of the spring 1102 is connected with the first plate 102, and another end of the spring 1102 is fixed with the clamping plate 1104. When the spring 1102 is compressed and then released, the clamping plate 1104 is driven by the spring 1102 to move on the top surface 1002 in a direction substantially perpendicular to a side surface of the second plate 104.

In operation, the clamping plate 1104 is moved towards the first plate 102 and, accordingly, the spring 1102 is compressed. A plurality of lenses 20 are placed into the recesses 106 in a one-to-one manner. Subsequently, the spring 1102 is released, the clamping plate 1104 is then driven by the spring 1102 to move towards the second plate 104 until the lenses 20 are firmly clamped between the clamping plate 1104 and the second plate 104. Next, a plurality of second lenses (not shown) is coupled to the first lenses 20 respectively.

In order to observe the relative position between the first lens 20 and the second lens, four alignment holes 108 are defined in the top surface 1002 around each recess 106. Generally, the first lens 20 and the second lens each include a cut-off portion, and the cut-off portion of the first lens 20 is labeled as 202. When the first lens 20 and the second lens are coupled to form a lens assembly, a first imaginary line perpendicularly connects an optical axis of the lens assembly and the cut-off portion 202 of the first lens 20, a second imaginary line perpendicularly connects the optical axis and the cut-off portion of the second lens. When an included angle between the first imaginary line and the second imaginary line is changed, optical performance of the lens assembly is changed. The four alignment holes 108 can help the operator of the apparatus 10 to recognize the included angle between the first and the second imaginary lines. The included angle represents the relative position between the first lens 20 and the second lens.

Figure 4:
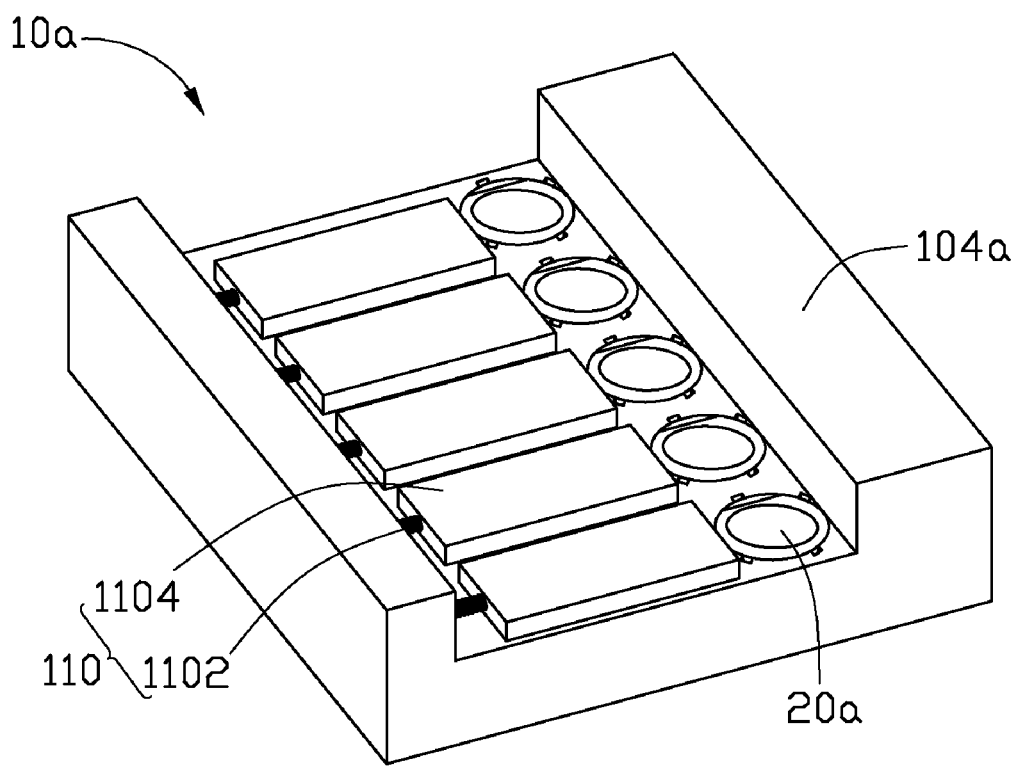
FIG. 4 is an isometric view of an apparatus for coupling a plurality of first lenses to a plurality of second lenses according to a second embodiment, with a plurality of first lenses clamped between a plurality of elastic members and a second plate.

Referring to FIG. 4, an apparatus 10a according to a second embodiment is shown. The apparatus 10a is similar to the apparatus 10, as shown in FIGS. 1-3. The apparatus 10a includes a plurality of elastic member 110a and a second plate 104a. Each elastic member 110a and the second plate 104a cooperatively clamp a second lens 20a in between. Each elastic member 110a includes a clamping plate 1104a and a spring 1102a.

Figure 5:
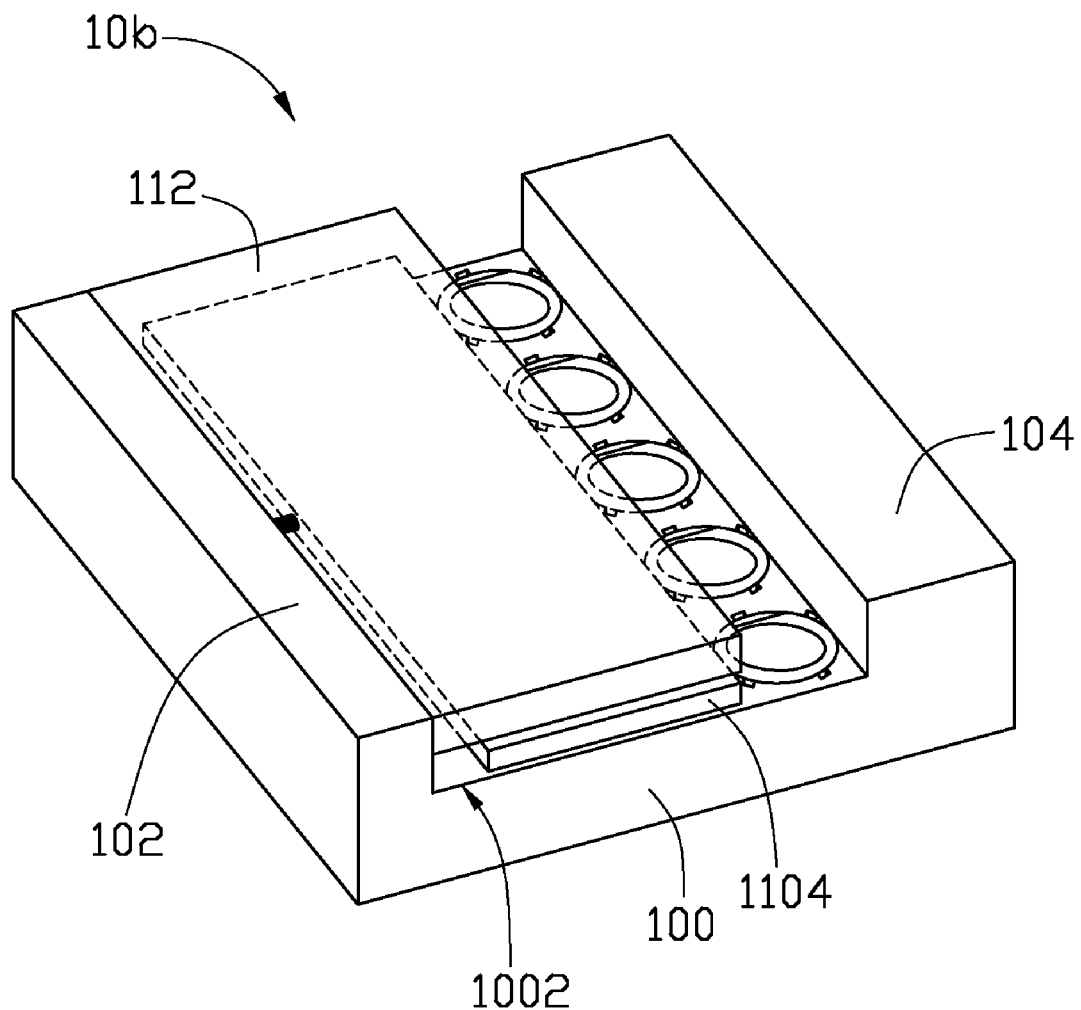
FIG. 5 is an isometric view of an apparatus for coupling a plurality of first lenses to a plurality of second lenses according to a third embodiment, with a plurality of first lenses clamped between an elastic member and a second plate.

Referring to FIG. 5, an apparatus 10b according to a third embodiment is shown. The apparatus 10b is similar to the apparatus 10 according to the first embodiment, as shown in FIGS. 1-3, except that the apparatus 10b further includes a guide plate 112 extending from the first plate 102 towards the second plate 104 in a direction substantially perpendicular to a surface of the first plate. The guide plate 112 is above the clamping plate 1104, and is configured for guiding the clamping plate 1104 to move on the top surface 1002 better.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. An apparatus for coupling a first lens to a second lens, the apparatus comprising:
   a base having a top surface;
   a first plate protruding from the top surface;
   a second plate opposite to the first plate protruding from the top surface;
   a recess defined in the top surface and located between the first plate and the second plate, the recess being configured for receiving the second lens; and
   an elastic member arranged on the top surface, a first end of the elastic member being connected with the first plate, the elastic member being configured for exerting a force on the first lens such that the first lens can be clamped between a second end of the elastic member and the second plate.

2. The apparatus of claim 1, further comprising two alignment holes defined around the recess.

3. The apparatus of claim 1, wherein the elastic member comprises a clamping plate and a spring, a first end of the spring is connected with the first plate, and a second end of the spring is connected with the clamping plate.

4. The apparatus of claim 1, further comprising a guide plate extending from the first plate towards the second plate, the elastic member being sandwiched between the guiding plate and the top surface of the base.

* * * * *